United States Patent [19]
Wirth et al.

[11] Patent Number: 5,291,334
[45] Date of Patent: Mar. 1, 1994

[54] MICRO-LENS PANORAMIC IMAGER

[75] Inventors: Allan Wirth, Bedford; Andrew J. Jankevics, Acton; Franklin M. Landers, Wakefield; Theresa L. Bruno, Bedford; Dante P. D'Amato, Swampscott; Lawrence E. Schmutz, Watertown, all of Mass.; Lawrence H. Gilligan, Charlottesville, Va.; John L. Duncan, Cary, N.C.

[73] Assignee: United Technologies Corporation, Hartford, Conn.

[21] Appl. No.: 827,794

[22] Filed: Jan. 30, 1992

[51] Int. Cl.⁵ .................... G02B 27/10; G02B 13/06
[52] U.S. Cl. ................................. 359/622; 359/435
[58] Field of Search ............... 359/622, 621, 619, 435, 359/434

[56] References Cited

U.S. PATENT DOCUMENTS

| | | | |
|---|---|---|---|
| 2,139,855 | 12/1938 | Saint Genies | 359/622 |
| 3,655,284 | 4/1972 | Agliata | 359/622 |
| 3,657,981 | 4/1972 | Benton | 359/736 |
| 4,168,900 | 9/1979 | Adachi | 359/619 |
| 4,448,499 | 5/1984 | Tokumura | 359/619 |

FOREIGN PATENT DOCUMENTS

| | | | |
|---|---|---|---|
| 66414 | 4/1982 | Japan | 359/619 |
| 21456 | 9/1909 | United Kingdom | 359/619 |

OTHER PUBLICATIONS

Keisuke Araki, "Compound Eye Systems For Nonunity Magnification Projection" Applied Optics, vol. 29, No. 28, Oct. 1, 1990.

Primary Examiner—Jon W. Henry
Attorney, Agent, or Firm—McCormick, Paulding & Huber

[57] ABSTRACT

A panoramic imaging system is formed from select configurations of micro-optic multiplets (MOM) comprised of two microlens modules (MLM). The MLMs themselves are formed from arrays of microlenses. The present panoramic imaging system is characterized by the two MLMs configured on concentric approximately spherical surfaces. The optic axis of each of the microlenses is tilted slightly with respect to its neighbor to allow for proper alignment of images to form a single primary image on a substantially spherical global image surface.

21 Claims, 3 Drawing Sheets

MICRO-LENS PANORAMIC IMAGER

TECHNICAL FIELD

The field of the invention is that of optical micro-lenses, and in particular, combinations of arrays of micro-lenses that form a panoramic or wide angle imaging system.

CROSS REFERENCE TO RELATED APPLICATION

Some of the subject matter hereof may be disclosed and/or claimed in the following commonly owned, copending application Ser. No. 07/828,268 which is incorporated herein by reference: "An Optical Instrument with Micro-Lenses".

BACKGROUND OF THE INVENTION

Arrays of small lenses having a diameter on the order of one millimeter are referred to as micro-lenses and have been made in a number of ways and used for a variety of purposes. An array of micro-lenses has been matched to an array of pixels on a television screen or other raster imaging device. Another use, such as that illustrated in "Agile Beam Steering Using Binary Optics Microlens Arrays", by W. Goltsos and M. Holz, Optical Engineering Vol. 29 No. 11, page 1392, is for steering a collimated beam of monochromatic radiation through an angle by translating one of a pair of binary micro-lens arrays that combine to form an array of Galilean telescopes. The beam is required to be monochromatic because binary micro-lenses are highly dispersive. It would be advantageous to utilize pairs of micro-lens arrays to provide for panoramic or wide angle imaging with broadband radiation. The present imaging system is drawn towards such an invention.

SUMMARY OF THE INVENTION

An object of the present invention is to provide an imaging system having an optical processor referred to as a micro-optic multiplet (MOM) that includes two or more micro-lens modules (MLM) optically matched in a specific fashion with specifically related parameters to provide panoramic or wide angle imaging.

Another object of the present invention is to provide an imaging system of the foregoing type wherein the MLMs lie on concentric spherical surfaces.

Still another object of the present invention is to provide an optical system of the foregoing type having an effective f/number that is approximately equal to that of the individual micro-lenses in the MLMs.

According to the present invention, an imaging system for processing incident optical radiation emitted from a source includes a first lenslet array of micro-lenses or lenslets each having a first focal length ($f_1$), a first pitch, and a first lens diameter ($d_1$), positioned about a portion of a first spherical surface having a first radius of curvature ($r_1$) at a first longitudinal distance along an axis to intercept said incident optical radiation. Also, there is a second lenslet array of micro-lenses each having a second focal length ($f_2$), second pitch, and a second lens diameter ($d_2$) positioned about a portion of a second spherical surface having a second radius of curvature ($r_2$) at a second longitudinal distance along said axis to intercept radiation emerging from said first lenslet array. The second lenslet array is configured to be concentric with the first lenslet array and is separated therefrom along said optic axis by a predetermined amount such that the incident radiation is focused by the combined action of a plurality of pairs of corresponding lenslets from the first and second lenslet arrays to an erect overlap image in a focal surface transverse to the optic axis located at distance C from the second spherical surface.

DESCRIPTION OF THE PREFERRED EMBODIMENTS

The present invention is an alternative to and improvement upon "fisheye" type very wide angle lenses, specifically imaging devices that cover up to a 360° field of view. These known lenses are burdened by large f/numbers corresponding to very low light gathering power. Additional features of the present invention include low cost and very robust construction. A first point of departure of the present invention over the prior art lies in its use of multiple arrays of micro-lenses, referred to as micro-lens modules (MLM), to form a single global image.

Figure 1:
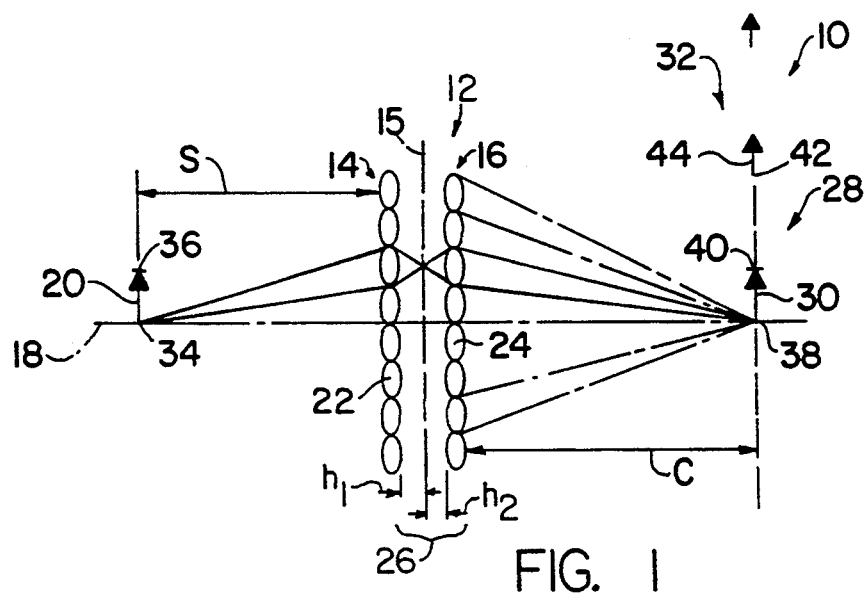
FIG. 1 illustrates the parameters of an optical system having a micro-optic multiplet.

Referring now to FIG. 1, there is illustrated an optical system 10 including a generalized micro-optic multiplet 12 (MOM), which comprises a set of at least two modules 14, 16 (MLM) of micro-lenses. These MLM are made from known materials such as optical epoxy, glass or zinc selenide. An axis 18 extends from left to right in the drawing and an object 20 (here, an arrow) is positioned on the axis a distance S from module 14, the leftmost module in the pair. MLM 14 has micro-lenses 22 of diameter $d_1$ and focal length $f_1$. MLM 16 is comprised of micro-lenses 24 of diameter $d_2$ and lens focal length $f_2$. The micro-lenses are alternatively referred to as lenslets. MLM 14 is spaced apart from MLM 16 along the axis by a distance $h_1+h_2$, denoted by reference numeral 26. MLM 14 is spaced from an intermediate image plane 15 by a distance $h_1$. Similarly, MLM 16 is spaced from the intermediate image plane by $h_2$. An array of images 28 comprising a central image 30 located on the axis and spurious images 32 is positioned an image distance C from MLM 16. The conditions required to form an image will be explained in detail below.

A MOM does not have an optic axis in the same sense that a conventional lens does. For purposes of forming an image, the optic axis will be taken to be a perpendicular drawn from the image to the MOM. The term primary image will be used for the image that is formed at the axis or is closest to the axis. When the two MLMs in MOM 12 are aligned so that the axis is at the edge of a lenslet in both arrays or is at the center of a lenslet in both arrays, the primary image will be on the axis 18. When the perpendicular does not meet this condition, the primary image will be displaced from the axis. This will be the case where a scene has more than one object. This is not a problem, since most objects have a finite size and many optical systems (e.g., cameras) are not aligned carefully. For a collimated beam, the axis of the beam will be taken as the optic axis.

MOMs also behave very differently from pairs of conventional glass lenses. A relationship corresponding to the Gaussion image equation is given by the following equation:

$$1/C = Q/R \, (1/S + 1/F_{eff}) \qquad (1)$$

In this equation, C is the distance from the right hand lens array to the image, S is the distance from the object to the first lens array, Q is the ratio $f_1$ divided by $f_2$, R is the ratio $d_1$ divided by $d_2$, and $F_{eff}$ is the effective focal length of the array. The effective focal length is defined as the distance between a microlens module and the focus of an input collimated beam. It may be either positive or negative.

Those skilled in the art will immediately appreciate that the minus sign in this equation results in properties very different from that of the Gaussion image equation as given by equation 2:

$$1/o + 1/i = 1/f \qquad (2)$$

where o is the object distance to a lens 0, i is the image distance to the lens and f is the focal length of the lens. In the classic lens maker's formula, when the object distance is increased, the image distance is decreased; i.e., the two distances move in opposite directions.

MOM 12 may be characterized by 5 parameters relating to the properties of micro-lenses: $f_1$, $f_2$, $d_1$, $d_2$, and the spacing $h_1 + h_2$. A corresponding set of global parameters may be defined for these local parameters: C (image distance), S (object distance), Mt (transverse magnification), Spn (spurious image spacing), and $F_{eff}$ (effective focal length). It is apparent to those skilled in the art that there is a five-dimensional "parameter space" that permits flexibility in design with the present invention that was previously unknown in the art.

The behavior of a MOM with MLMs whose lenslets of different respective pitch may be understood as follows. Consider the set of rays from an object at infinity that strike a MLM. The particular rays that pass through the center of the lenslets of that MLM are not deviated thereby. If a second lens MLM of identical pitch is now placed in the beam and the centers of the lenslets aligned with the centers of the lenslets of the first MLM, it too will have no effect on the rays. If, however, the second MLM is displaced slightly, each ray will then be deviated through some angle determined by the displacement of the two MLMs. This is the basic concept behind lens array scanners.

Rather than displacing the second MLM, it is possible to change the spacing of the lenslets thereof. When the rays progressively further off of the lenslet axis are considered, the rays from the centers of the first MLM's lenslets pass through the second MLM's lenslets at progressively increasing distances. As a result, they are deviated through progressively increasing angles. If the second MLM's lenslets are closer together, the rays strike further and further outside the lenslet's centers and are deviated more and more in the direction of the lenslet's centers. Since the angle of deviation depends linearly on the distance from the axis of alignment, these rays all cross that axis and each other at one point. This point defines the overlap plane of the MOM.

If the second MLM's pitch is greater than that of the first, then the deviation of the rays is in the opposite sense. If these diverging rays are traced back they define a virtual overlap plane in front of the MOM. The differential pitch of the two arrays thus leads to a global optical power for the MOM. This converging or diverging power is superimposed on the imaging properties of each lenslet pair.

Returning to FIG. 1, an effective focal length ($F_{eff}$) of one or a combination of two of the MOMs may be thought of as the position of a real image or virtual image produced by a collimated beam traversing the MOM. The formula for this effective focal length is given by equation 3:

$$F_{eff} = \frac{f_1 f_2}{f_2(R-1)} = \frac{f_1}{R-1} \qquad (3)$$

Figure 3:
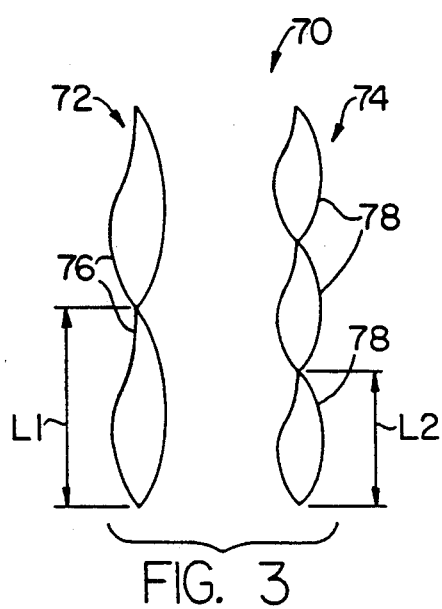
FIG. 3 shows a micro-optic multiplet (MOM) wherein the pitch of a first lenslet array is different from that of a second lenslet array.

Note that this equation does not depend on $f_2$ and that when the pitch of the two MLMs is equal, $F_{eff}$ is infinite; i.e. the output beam is collimated. As used herein, "pitch" is defined as the number of lenslets per unit length of a MLM. As an example of pitches, FIG. 3 shows a MOM 70 having first and second MLMs 72 and 74 respectively. MLM 72 is comprised of lenslets 76,76 each with length L1, and MLM 74 is comprised of lenslets 78,78,78 each with length L2. Note that L1 is not equal to L2. Hence, the pitch of each array need not be the same. It should be noted that the above-mentioned pitch differences of the two lenslet arrays may be referring to either the lenslet's height, width or a combination of the two lenslets thereof. It should also be noted that lenslets in a MOM need not be limited to a uniform radius of curvature. For example, the lenslets 76 and 78 of FIG. 3 exhibit non-uniform or compound curvature. For MOMs that have equal pitch, it is possible to form an image only in the special case of a 1:1 MLM relay. Note that parameters and quantities analogous to those used in classical optics are presented herein. However, these quantities are not, in general, the same as their classical counterparts and may be derived using assumptions that differ.

The transverse magnification, or the ratio of image to object size is given by equation 4:

$$M_t = \frac{f_1}{(S - f_1)\left[R\left[1 + \frac{f_1}{S - F_1}\right] - 1\right]} \qquad (4)$$

This formula does not depend on $f_2$ or on the image distance, in sharp contrast to the classical result. Thus, a desired magnification can be achieved with two parameters remaining free for variation.

A condition for a "clean" image is that spurious images be separated clearly from the main image. The transverse separation of images for the present MOM for an object at infinity is $d_1/(R-1)$. The start of the first spurious image is also the point where $nd_1 = md_2$ equals an integer (for integers n and m). It is convenient to express the separation in angular terms. From the relationship of C and $F_{eff}$ set forth above the angular magnification of an object at infinity is Q/R. The angular separation of images is thus:

$$[d_1/(R-1)]/C = [d_1/(R-1)]/F_{eff} = d_1/f_1. \quad (5)$$

For pairs of positive MLMs there is a set of images of the same point in object space; i.e. there is a one to many mapping of object space to image space. As a point moves away from the optic axis (axis 18, FIG. 1), a limiting angle is reached beyond which the primary image of the point overlaps the first spurious image of an axial point. Consequently, there is an unambiguous angular range defined as the angular range in object space that maps to an angular range in image space having an upper bound equal to the initial angle subtended by the first spurious image.

In FIG. 1, point 34 is the bottom of object arrow 20 and point 36 is the tip, with corresponding points 38 and 40 in image space. As point 36 moves away from the optic axis (toward the top page in FIG. 1), it will eventually overlap point 42, the bottom of the first spurious image 44. In the case of a triplet MOM with a field lens of conventional design (not shown) located between two MLMs, the image separation and the unambiguous angular range are twice that given above because the field lens suppresses the odd spurious images. A field lens in this context refers to a lens positioned at the image between the MLMs. As such, the field lens does not alter the parameters of the optical instrument shown in FIG. 1, but rather redirects light where it is desired. Alternatively, image separation can be expressed as that position where the distance from the axis to the first spurious image $Sp_1 = d_1/(R-1)$ is greater than the size of the primary image.

The calculations set forth above are for a spacing, $h_1 + h_2$, such that the images at axis 18 from all of the lenslet pairs are in focus at the same distance along that axis. For a given image and object distance, the spacing, $h_1 + h_2$, required for a focus is given by:

$$h_1 + h_2 = \frac{CS(f_1 + f_2) - (f_1 f_2)(S + C)}{(S - f_1)(C - f_2)} \quad (6)$$

The present panoramic imaging system is based on the general concept of using pairs of lens arrays to produce single images. As set forth above, if two MLMs are arranged in such a way that they together form an array of non-inverting telescopes, it can be shown that for the case of 1:1 imaging all of the images formed by the array elements correctly overlay to form one image. This feature of non-inverting imagers has been utilized for some time in compact copiers where the image of the original is formed by a linear array of GRIN (Graduated Index of refraction) lenses. The limitation to 1:1 imaging is quite strict for planar lens arrays. At any other ratio the images from different lens pairs do not correctly overlay to form a single image.

Figure 2:
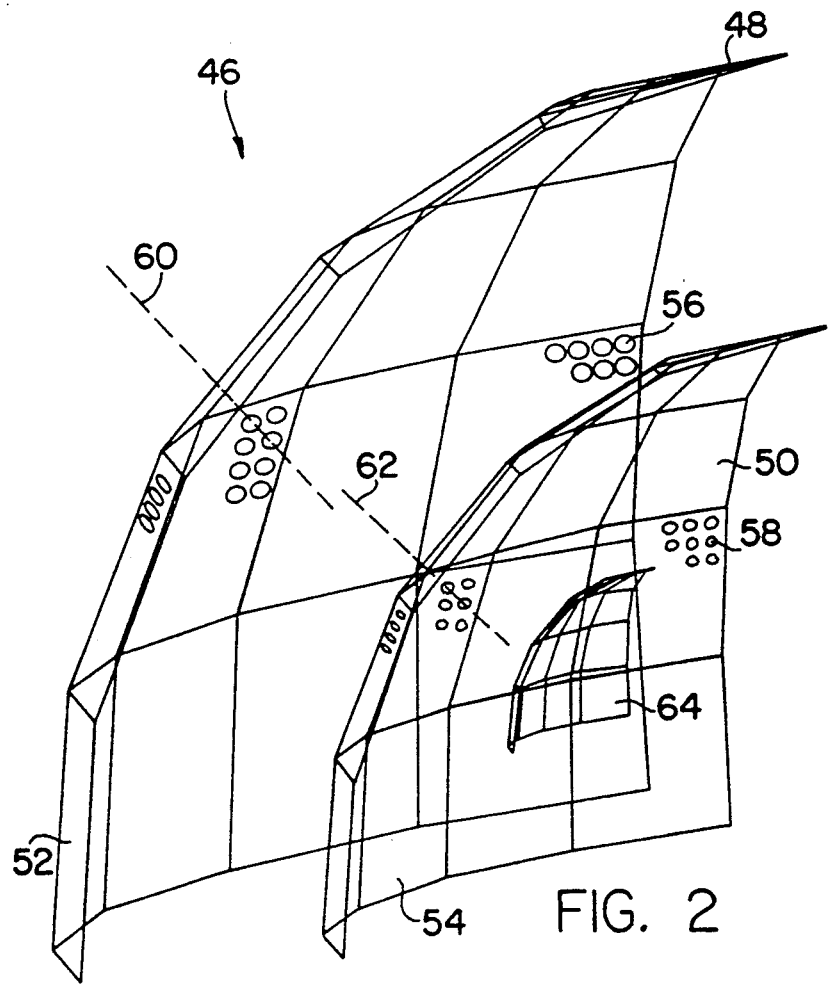
FIG. 2 is a simplified schematic illustration of a portion of a panoramic imaging system provided according to the present invention.

With the present invention, this serious shortcoming is eliminated by placing the lens arrays on concentric spherical shells. In FIG. 2 there is shown in schematic form a portion of an optical imaging system 46 provided according to the present invention. The imaging system comprises first and second MLMs 48, 50 of the type set forth above configured on respective substantially spherical surface portions 52, 54. Lenslets 56 in MLM 48 are each configured with associated lenslets 58 of MLM 50 to form lenslet pairs. The optic axis of each lenslet pair (e.g. lenslet optic axes 60, 62) is tilted slightly with respect to its neighbor lenslets to allow for proper alignment of the images. An analysis of the optical system 46 shows that it provides acceptable imaging for a wide range of conjugate ratios. The global image plane 64 is also a spherical surface.

The present panoramic imaging system has a number of advantages over classical "fisheye" very wide angle lenses. The effective aperture ratio of this assembly is roughly equal to the f/number of the individual lenses. This may be as low as f/1 to f/2, very much faster than a fisheye lens. The optical and mechanical configuration of this unit is quite simple, making fabrication by low cost techniques such as injection molding possible. Possible limitations of the optical imaging system 46 are poorer image quality as compared to a fisheye lens, primarily because of the two element design and the curved image plane. For detecting the focused image the spherical image surface may be matched with suitable fiber optic devices or a spherical photocathode of a "Generation I" image intensifier or equivalent.

Figure 5:
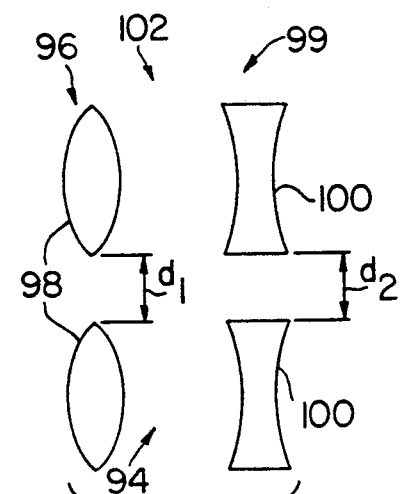
FIG. 5 illustrates a pair of lenslets configured to produce a virtual image.
Figure 4:
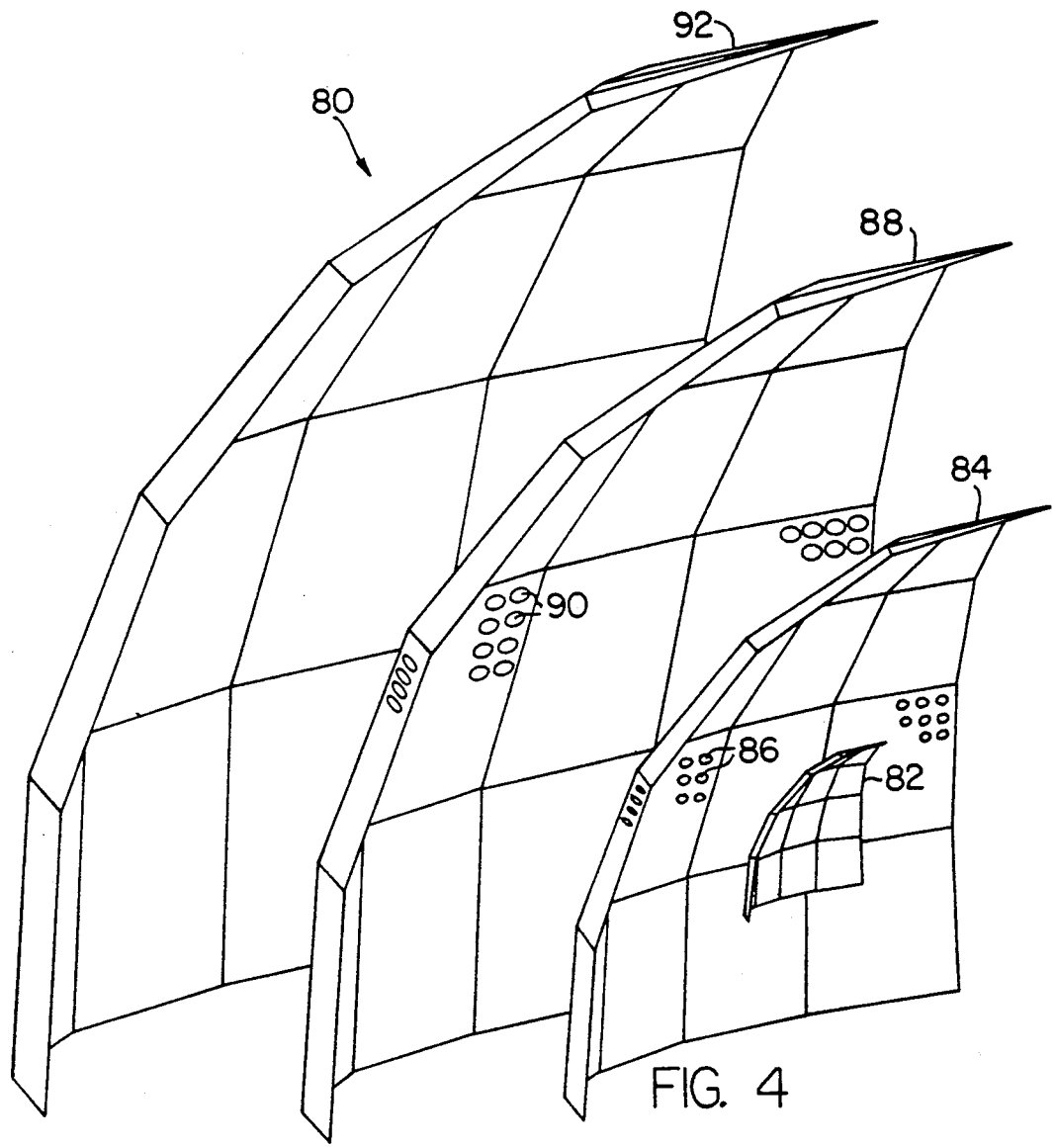
FIG. 4 is a simplified schematic illustration of a portion of a panoramic imaging system used as a projection device in another embodiment of the present invention.

Those skilled in the art will note the present imaging system may also be used as a projection device. Images introduced into the focal surface will be projected onto a large spherical surface outside the shell. For example, FIG. 4 schematically illustrates a projection device 80 having a surface 82 introducing light to a first MLM 84 which is comprised of lenslets 86. The light thereafter passes through a second MLM 88 comprised of lenslets 90. The focused image is then formed on a spherical projection surface 92. The concept is not limited to the production of real images. By properly adjusting the focal lengths and spacing of the two MLMs, the imaging system may be made to form virtual images. For example, FIG. 5 shows a MOM 94 including a positive MLM 96 of convex lenslets 98 and a negative MLM 99 of concave lenslets 100 in an optical system 102 that is not Galilean in configuration. For example, a magnifying glass may be made of system 102 with the parameters arranged to give a virtual image with a magnification greater than one. An example of such an arrangement is:

$f_1 = 2$ mm, $d_1 = 1$ mm
$f_2 = 0.4$ mm, $d_2 = 0.9833$ mm
$S = 16.09$ mm

In the above example, $f_1$ is the focal length of lenslets 98 and $f_2$ is the focal length of lenslets 100. $D_1$ is the separation between lenslets 98 and $d_2$ is the separation between lenslets 100. S is the separation between MLMs 94 and 96.

As noted above, the present panoramic imager comprises, in part, two MLMs on concentric spherical surfaces. There are well defined relationships between the various parameters of the lenslet arrays that comprise the MLMs and the radii of the surfaces. Let $r_1$ and $r_2$ be the radii of the outer and inner spherical surfaces, respectively. The focal length of the lenslets in the outer MLM is $f_1$ and of the second, inner MLM is $f_2$. The diameters of the lenslets in these arrays are $d_1$ and $d_2$. Initially note that there is a requirement that the centers of pairs of lenslets in the two shells lie substantially along radii. As a result:

$$\frac{r_1}{r_2} = \frac{d_1}{d_2} \quad (7)$$

Now, the requirement that each pair of lenses relay an erect image of the source to the same point on the image surface leads to a relation between the radii, focal lengths, and lens diameters:

$$r_2 = f_2 + \frac{f_1 + f_2}{\left(\frac{d_1}{d_2}\right) - 1} \tag{8}$$

where R is defined to be the ratio of lens diameters $d_1/d_2$ (see equation (1)). The distance, $C_s'$, from the inner shell to the focal surface for an infinitely distant object, $C_\infty$, may then be derived from the lensmakers formula:

$$C_\infty = \frac{f_2(r_1 - r_2 - f_1)}{r_1 - r_2 - f_1 - f_2} \tag{9}$$

The radius of the focal surface is thus $r_2 = C_s'$. Finally, it is straightforward to calculate the effective focal length:

$$F_{eff} = \frac{f_1 f_2}{r_1 - r_2 - f_1 - f_2} \tag{10}$$

Figure 6:
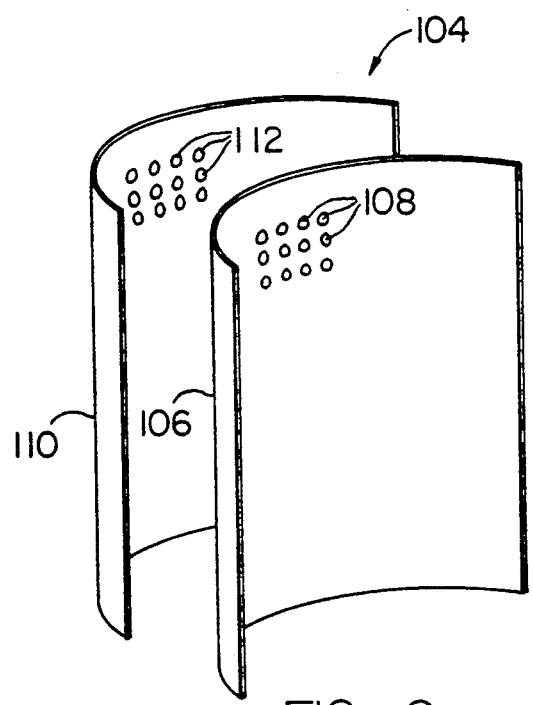
FIG. 6 illustrates another embodiment of the present invention utilizing coaxial cylindrical surfaces.

An alternative panoramic imaging system can be made with the MLMs configured on coaxial cylindrical surfaces. In the azimuthal direction the lenslet pairs are located along radial lines as in the imaging system of FIG. 2. In the axial direction, the pitch of the lenslets of the respective MLMs will differ and is selected to form an image. In general, the pitch of the lenslets of each MLM will differ in the azimuthal and axial directions, i.e. the lenslets are not square. Further, if the pitch of the lenslets in the MLMs is equal in the axial direction the imaging system acts analogously to a standard cylindrical lens and forms line images. FIG. 6 schematically illustrates a portion of an imaging system 104 utilizing coaxial cylindrical surfaces. The imaging system includes an MLM 106 of lenslets 108, and an MLM 110 of lenslets 112.

It should be understood that the present invention is not limited to the particular embodiments shown and described herein, but that various changes and modifications may be made without departing from the spirit and scope of this novel concept as defined by the following claims.

We claim:

1. An imaging system for processing incident optical radiation emitted from a source comprising:

a first lenslet array of micro-lenses each having a first focal length ($f_1$), a first pitch, and a first lens diameter ($d_1$), positioned about a portion of a first spherical surface having a first radius of curvature ($r_1$) at a first longitudinal distance along an axis to intercept said incident optical radiation; and a second lenslet array of micro-lenses each having a second focal length ($f_2$), second pitch, and a second lens diameter ($d_2$) positioned about a portion of a second spherical surface having a second radius of curvature ($r_2$) adjustably positioned at a second longitudinal distance along said axis to intercept radiation emerging from said first lenslet array, said second lenslet array configured to be concentric with said first lenslet array and being separated along said optic axis from said first lenslet array by a predetermined amount such that said incident radiation is focused by the combined action of a plurality of pairs of corresponding lenslets from said first and second lenslet arrays to an erect overlap image in a substantially spherical focal surface transverse to said optic axis located at distance C from said second spherical surface.

2. The imaging system of claim 1 wherein said first and second lenslet arrays respectively comprise first and second micro-lens modules (MLMs).

3. The imaging system of claim 1 wherein said first pitch does not equal said second pitch in magnitude.

4. The imaging system of claim 2 wherein lenslets in said first MLM have a corresponding lenslet in said second MLM forming lenslet pairs such that each of said pairs of lenslets relay an erect image to a point on said substantially spherical focal surface.

5. The imaging system of claim 4 wherein:

$$r_2 = f_2 + \frac{f_1 + f_2}{\left(\frac{d_1}{d_2}\right) - 1}$$

6. The imaging system of claim 4 wherein the distance from said focal surface to said second spherical surface for an object at infinity is:

$$C_\infty = \frac{f_2(r_1 - r_2 - f_1)}{r_1 - r_2 - f_1 - f_2}$$

7. The imaging system of claim 4 wherein lenslets in said first MLM and said second MLM exhibit a relationship between respective radii of curvature and respective lens diameters as:

$$\frac{r_1}{r_2} = \frac{d_1}{d_2}$$

8. The imaging system of claim 1 wherein said first and second spherical surfaces have compound curvature.

9. The imaging system of claim 1 wherein said first and second lenslet arrays are configured to produce a virtual image.

10. The imaging system of claim 1 wherein said first and second lenslet arrays are configured to have an effective aperture ratio of approximately f/1.

11. A projection device for use in projecting an image formed from optical radiation at an image surface on an approximately spherical projection surface, said device comprising:

a first lenslet array of micro-lenses each having a first focal length ($f_1$), a first pitch, and a first lens diameter ($d_1$), positioned about a portion of a first spherical surface having a first radius of curvature ($r_1$) at a first distance from said image surface to intercept said incident optical radiation; and a second lenslet array of micro-lenses each having a second focal length ($f_2$), second pitch, and a second lens diameter ($d_2$) positioned about a portion of a second spherical surface having a second radius of curvature ($r_2$) at a second distance from said image surface to intercept radiation emerging from said first lenslet array, said second lenslet array configured to be concentric with said first lenslet array and being separated from said first lenslet array by a predetermined amount such that said incident radiation is focused by the combined action of a plurality of pairs of corresponding lenslets from said first and second lenslet arrays to an erect overlap image in said projection surface.

12. The projection device of claim 11 wherein said first and second lenslet arrays respectively comprise first and second micro-lens modules (MLMs).

13. The projection device of claim 11 wherein said first pitch does not equal said second pitch in magnitude.

14. The projection device of claim 12 wherein lenslets in said first MLM have a corresponding lenslet in said second MLM forming lenslet pairs such that each of said pairs of lenslets relay an erect image to a point on a projection surface.

15. The projection device of claim 14 wherein:

$$r_2 = f_2 + \frac{f_1 + f_2}{\left(\frac{d_1}{d_2}\right) - 1}$$

16. The projection device of claim 14 wherein the distance from said focal surface to said second spherical surface for an object at infinity is:

$$C_\infty = \frac{f_2(r_1 - r_2 - f_1)}{r_1 - r_2 - f_1 - f_2}$$

17. The projection device of claim 14 wherein lenslets in said first MLM and said second MLM exhibit a relationship between respective radii of curvature and respective lens diameters as:

$$\frac{r_1}{r_2} = \frac{d_1}{d_2}$$

18. The projection device of claim 11 wherein said first and second spherical surfaces have compound curvature.

19. The imaging system of claim 2 wherein said MLMs are configured on coaxial cylindrical surfaces.

20. The imaging system of claim 2 wherein said MLMs are comprised of lenslets having different pitches in the azimuthal and axial direction.

21. The imaging system of claim 2 wherein the pitch of the lenslets of said MLMs are equal in the axial direction.

* * * * *